(12) United States Patent
Uno

(10) Patent No.: US 9,848,160 B2
(45) Date of Patent: Dec. 19, 2017

(54) IMAGING APPARATUS, IMAGING METHOD AND PROGRAM

(71) Applicant: NEC Corporation, Tokyo (JP)

(72) Inventor: Masayuki Uno, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/023,457

(22) PCT Filed: Aug. 8, 2014

(86) PCT No.: PCT/JP2014/071019
§ 371 (c)(1),
(2) Date: Mar. 21, 2016

(87) PCT Pub. No.: WO2015/045645
PCT Pub. Date: Apr. 2, 2015

(65) Prior Publication Data
US 2016/0212371 A1      Jul. 21, 2016

(30) Foreign Application Priority Data

Sep. 25, 2013  (JP) .................................. 2013-197753

(51) Int. Cl.
*H04N 5/77*       (2006.01)
*H04N 9/82*       (2006.01)
(Continued)

(52) U.S. Cl.
CPC ........... *H04N 5/772* (2013.01); *G11B 27/031* (2013.01); *H04N 5/23293* (2013.01);
(Continued)

(58) Field of Classification Search
None
See application file for complete search history.

(56) References Cited

U.S. PATENT DOCUMENTS

2002/0029230 A1\* 3/2002 Takiguchi ......... G06F 17/30265
715/248
2007/0258642 A1\* 11/2007 Thota ................ G06F 17/30241
382/173
(Continued)

FOREIGN PATENT DOCUMENTS

EP      2 252 044 A2    11/2010
JP      10-207400       8/1998
(Continued)

OTHER PUBLICATIONS

International Search Report dated Sep. 22, 2014, in corresponding PCT International Application.
(Continued)

*Primary Examiner* — Timothy J Henn
(74) *Attorney, Agent, or Firm* — Finnegan, Henderson, Farabow, Garrett & Dunner, L.L.P.

(57) ABSTRACT

An imaging apparatus includes a display control unit that displays, according to an operation of activating an imaging unit, a first region in which an image created by the imaging unit is displayed and a second region in which map information is displayed; and an image recording unit, wherein according to an operation of appending the image to the map information after an imaging instructing operation for the first region, the image recording unit adds location information about a position, at which the appending operation to the map information has been performed, to the image and stores the image.

18 Claims, 7 Drawing Sheets

(51) Int. Cl.
*G11B 27/031* (2006.01)
*H04N 5/232* (2006.01)
*H04N 5/265* (2006.01)
*G03B 17/24* (2006.01)

(52) U.S. Cl.
CPC ........... *H04N 5/265* (2013.01); *H04N 9/8205* (2013.01); *G03B 17/24* (2013.01)

(56) References Cited

U.S. PATENT DOCUMENTS

| | | | |
|---|---|---|---|
| 2008/0012960 A1* | 1/2008 | Uchiyama | H04N 1/2112 348/231.2 |
| 2009/0184982 A1* | 7/2009 | Takakura | H04N 5/772 345/681 |
| 2009/0189811 A1* | 7/2009 | Tysowski | G01S 19/14 342/357.34 |
| 2009/0237547 A1 | 9/2009 | Misawa et al. | |
| 2009/0278973 A1 | 11/2009 | Sogoh et al. | |
| 2010/0045518 A1* | 2/2010 | Lee | H04N 1/00307 342/357.43 |
| 2012/0081574 A1* | 4/2012 | Kawakami | H04N 9/8205 348/231.3 |
| 2012/0169769 A1* | 7/2012 | Minamino | G06T 17/05 345/629 |
| 2012/0200740 A1* | 8/2012 | Gum | G01S 19/14 348/231.3 |
| 2014/0240575 A1* | 8/2014 | Kaneda | H04N 5/23293 348/333.01 |

FOREIGN PATENT DOCUMENTS

| | | |
|---|---|---|
| JP | 2001-101225 | 4/2001 |
| JP | 2007-235448 | 9/2007 |
| JP | 2009-75656 | 4/2009 |
| JP | 2009-225350 | 10/2009 |
| JP | 2012-147167 | 8/2012 |
| JP | 2013-84104 | 5/2013 |

OTHER PUBLICATIONS

Extended European Search Report issued by the European Patent Office in counterpart European Patent Application No. 14847450.5, dated Apr. 11, 2017.

* cited by examiner

| X AXIS | Y AXIS | LOCATION INFORMATION |
|---|---|---|
| X1 | Y1 | 1384749、352145 |
| X2 | Y2 | 1394558、354049 |
| X3 | Y3 | 1351721、344416 |

| IDENTIFIER | LOCATION INFORMATION | REGION SEGMENTATION |
|---|---|---|
| 001 | 1384749、352145 | 2 |
| 002 | 1394558、354049 | 2 |
| 003 | X3、Y3 | 3 |

(X1、Y1)

IMAGING APPARATUS, IMAGING METHOD AND PROGRAM

CROSS-REFERENCE TO RELATED PATENT APPLICATIONS

This application is a National Stage Entry of International Application No. PCT/JP2014/071019, filed Aug. 8, 2014, which claims priority from Japanese Patent Application No. 2013-197753, filed Sep. 25, 2013. The entire contents of the above-referenced applications are expressly incorporated herein by reference.

TECHNICAL FIELD

The present invention relates to an imaging apparatus, an imaging method and a relevant program.

BACKGROUND ART

In recent years, cellular phones have a camera function or a GPS function, where when imaging is performed by using the camera function, location information about an imaging place, which is identified by means of the GPS function, is automatically added to an obtained image, as another function.

Additionally, an electronic camera technology of storing an obtained image to which map information is added is disclosed (see Patent Document 1).

PRIOR ART DOCUMENT

Patent Document

Patent Document 1: Japanese Unexamined Patent Application, First Publication No. 2001-101225.

DISCLOSURE OF INVENTION

Problem to be Solved by the Invention

However, in an apparatus in which location information about the imaging place is automatically added, the location information is always added even when the user does not desire the addition and it takes time to delete the location information.

In addition, in the method disclosed in Patent Document 1, when location information is added to an image obtained by the user's imaging operation, it is necessary for the user to display both the obtained image and map information, and the user also must select desired location information from the map information and associates the selected information with the displayed image. That is, in the method of Patent Document 1, the imaging operation and the operation of associating the location information to the image are separately performed, which is complicated.

In light of the above circumstances, an object of the present invention is to provide an imaging apparatus, an imaging method and a relevant program, which can solve the above problems.

Means for Solving the Problem

The present invention provides an imaging apparatus comprising:

a display control unit that displays, according to an operation of activating an imaging unit, a first region in which an image created by the imaging unit is displayed and a second region in which map information is displayed; and an image recording unit, wherein according to an operation of appending the image to the map information after an imaging instructing operation for the first region, the image recording unit adds location information about a position, at which the appending operation to the map information has been performed, to the image and stores the image.

The present invention also provides an imaging method comprising:

displaying, according to an operation of activating an imaging unit, a first region in which an image created by the imaging unit is displayed and a second region in which map information is displayed; and performing recording, wherein according to an operation of appending the image to the map information after an imaging instructing operation for the first region, location information about a position, at which the appending operation to the map information has been performed, is added to the image and the image is stored.

The present invention also provides a program used to make a computer function as:

a device that displays, according to an operation of activating an imaging unit, a first region in which an image created by the imaging unit is displayed and a second region in which map information is displayed; and a device wherein according to an operation of appending the image to the map information after an imaging instructing operation for the first region, this device adds location information about a position, at which the appending operation to the map information has been performed, to the image and stores the image.

Effect of the Invention

In accordance with the present invention, it is possible to obtain an effect to easily associate an obtained image with location information.

MODE FOR CARRYING OUT THE INVENTION

First Embodiment

Below, an imaging apparatus as an embodiment of the present invention will be explained with reference to FIGS. 1 to 7.

Figure 1:
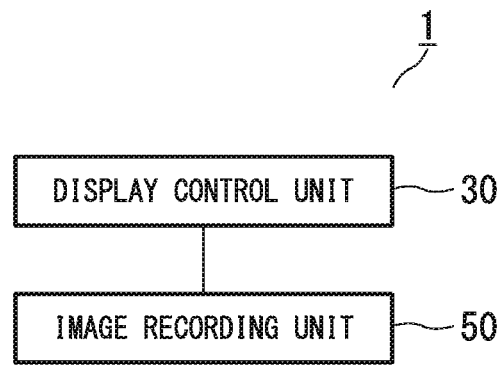
FIG. 1 is a diagram showing the minimum structure of an imaging apparatus according to a first embodiment of the present invention.

FIG. 1 is a diagram showing the minimum structure of an imaging apparatus according to a first embodiment.

In this figure, reference numeral 1 indicates the imaging apparatus. As shown in FIG. 1, the imaging apparatus 1 has at least a display control unit 30 and an image recording unit 50.

The display control unit 30 has a function of controlling display information that is displayed on a display unit of the own apparatus or a display unit (screen) of a display apparatus connected to the own apparatus. In the present embodiment, the display control unit 30 performs the following primary display control operations.

In a first operation, a screen is divided into at least two display regions in response to a user's operation of activating an imaging unit, where an image (to be) obtained via the imaging unit is displayed in the first region, and map information is displayed in the second region. In addition, a third region in which only a background color is displayed may be provided.

In a second operation, when any image obtained via the imaging unit is associated with location information which is displayed at a corresponding position in the second region, appendage identification information which indicates that the association has been established is displayed at the relevant position.

The image recording unit 50 has a function, executed in response to a user's operation, of adding location information to an image obtained by the user and recording the image. More specifically, when the user performs the imaging and then designates any position on the area of map information, the image recording unit 50 adds a location information item at the position to the image and records the image having the information item. Additionally, if the user designates any position in the third region after obtaining the image, the image recording unit 50 records the image without adding location information to the image.

Figure 2:
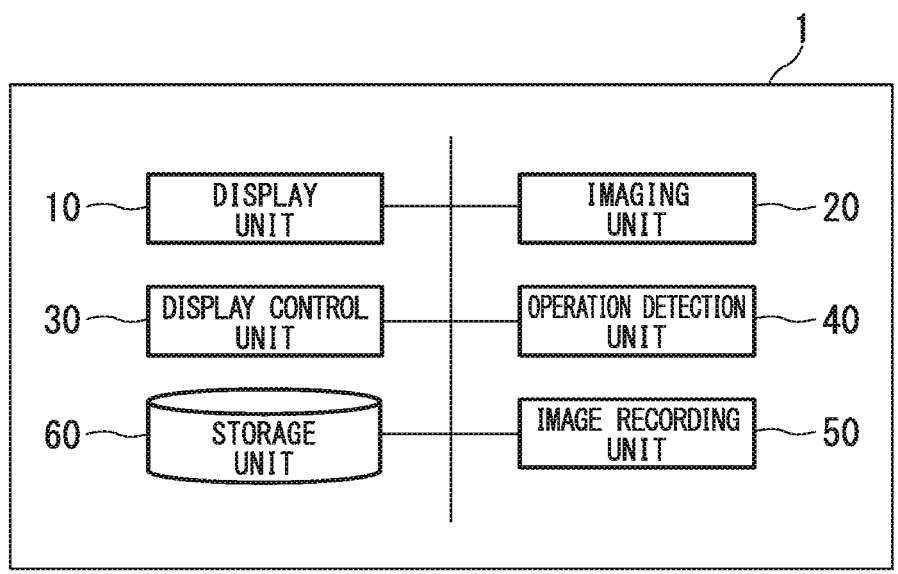
FIG. 2 is a diagram showing a specific structure of the imaging apparatus according to the first embodiment.

FIG. 2 is a diagram showing a specific structure of the imaging apparatus according to the first embodiment. In FIG. 2, functional units identical to those in FIG. 1 are given identical reference numerals in the following explanation.

As shown in FIG. 2, the imaging apparatus 1 has a display unit 10, an imaging unit 20, a display control unit 30, an operation detection unit 40, an image recording unit 50, and a storage unit 60.

The display unit 10 is a display screen of the imaging apparatus 1. The display unit 10 may have an integrated form of a display and a touch panel so as to implement both a display function and an inputting function.

The imaging unit 20 has a camera function of creating a static image or a video. The imaging unit 20 may be a camera module which includes an image sensor such as a CMOS or CCD. The imaging unit 20 creates a static image or a video in response to a user's imaging instruction.

The operation detection unit 40 obtains an user's operational designation according to a user's touching, hovering, or key pressing operation onto the display unit 10. The "hovering" operation is a moving operation of a finger or the like while the finger is slightly apart from the screen.

The storage unit 60 is a database in which images obtained by the user, map information pertaining to the second region, or the like, are stored.

The display control unit 30, the operation detection unit 40, and the image recording unit 50 are functional units implemented by a program executed by a CPU (central processing unit) provided in the imaging apparatus 1.

Figure 3A:
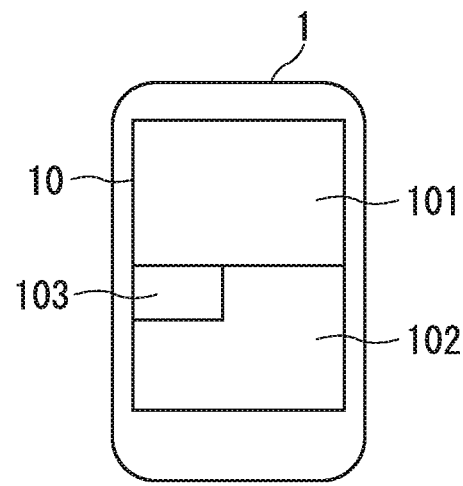
FIG. 3A is a diagram showing an example of appearance of the imaging apparatus according to the first embodiment.
Figure 3B:
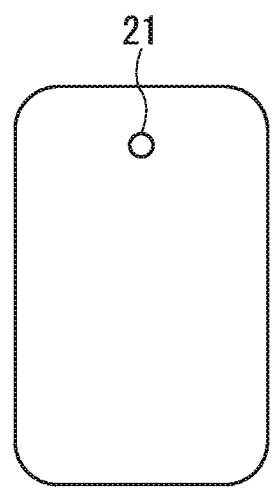
FIG. 3B is also a diagram showing an example of the appearance of the imaging apparatus.

FIGS. 3A and 3B are diagrams showing an example of appearance of the imaging apparatus according to the first embodiment.

A representative example of the imaging apparatus 1 of the first embodiment is a cellular phone (smartphone) which can function as a computer.

As shown in FIG. 3A, the imaging apparatus 1 has the display unit 10 on a first main surface of the body of the apparatus. In addition, as shown in FIG. 3B, the imaging apparatus 1 has a lens 21 of the imaging unit on a second main surface of the body.

When the user enables the camera function by performing a predetermined operation, the imaging unit 20 is activated. Then the display control unit 30 simultaneously displays a first region 101, a second region 102, and a third region 103 on the display unit 10.

The first region 101 is a region where an image created by the imaging unit 20 is displayed. The user checks the image displayed in this region so as to image a target to be imaged. The first region 101 has an area sufficiently large for the user to check how the target is imaged. If the display unit 10 is divided into two regions having the same area along a horizontal axis, the first region 101 may be set to the upper half region.

The second region 102 is a region where map information is displayed. The map information is stored in the storage unit 60 of the imaging apparatus 1 in advance, and the display control unit 30 may retrieve the stored information and display it. In another example, the display control unit 30 may acquirer map information via a communication unit (not shown in the present figure) from an external server or the like and display it.

In initial setting, a map having a specific scale, which includes the current location of the user, is displayed as the map information in the second region. The current location of the user is indicated, for example, by a flickering green circle so as to be identified.

Here it is assumed that the information which indicates the current location is obtained by means of a GPS function of the imaging apparatus 1. Additionally, the user may select any location (in the map information) to be displayed when the imaging unit 20 is activated, by using a program for the relevant selection.

The map information can be scrolled by a user's flicking operation (as quickly moving a finger on a screen or flicking the screen by a finger) and thus map information for another geographical area may be displayed. In addition, the scale of the map can be changed by a user's pinch-in operation (of decreasing the distance between two fingers on the screen) or a user's pinch-out operation (of increasing the distance between two fingers on the screen). The second region 102 has an area sufficiently large for the user to check the map information. If the display unit 10 is divided into two regions having the same area along a horizontal axis, the second region 102 may be set to the lower half region.

The third region 103 is a region where the location information applied to the second region 102 is not displayed. For example, the third region 103 is a region provided in the vicinity of the boundary between the first region 101 and the second region 102 and the minimum area of the third region is large for a user's fingertip to touch this region. An icon image may be displayed in the third region 103.

Figure 4A:
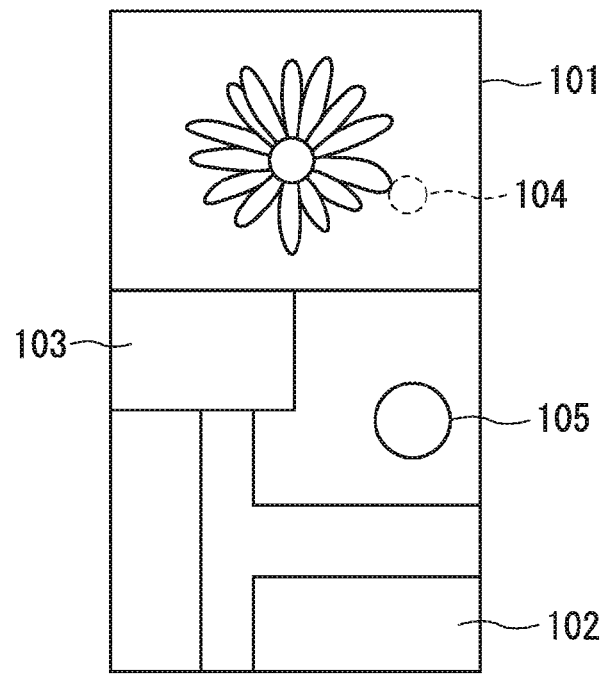
FIG. 4A is a diagram showing an example of the imaging operation according to the first embodiment.
Figure 4B:
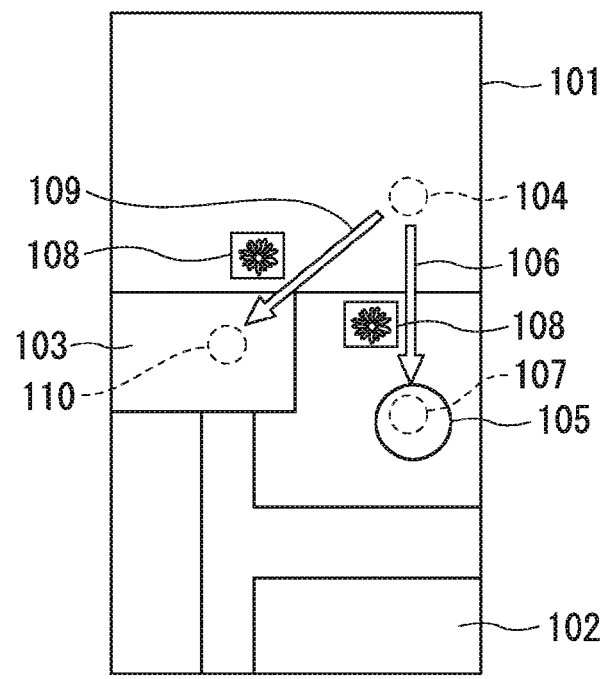
FIG. 4B is also a diagram showing an example of the imaging operation.

FIGS. 4A and 4B are diagrams showing an example of the imaging operation of the imaging apparatus according to the present embodiment. An operation of associating an image obtained via the user's operation with location information will be explained with reference to these figures. In the shown example, the second region 102 is wider than the first region 101.

FIG. 4A shows an image displayed on the display unit 10 when the imaging unit 20 of the imaging apparatus 1 is activated so as to image a flower and the lens 21 is directed to the target flower. The flower is displayed in the first region 101 while map information in the vicinity of the user's current location is displayed in the second region 102. A reference numeral 105 indicates the user's current location. The current location 105 may be indicated by a flickering green circle.

When the user checks the flower image displayed in the first region 101 and recognizes that the imaging condition is appropriate, the user performs an imaging instructing operation. In the present embodiment, it is assumed that the imaging instructing operation is a user's operation of tapping (contacting) any region 104 within the first region 101 by a finger of the user or approaching the finger toward the region 104. When the user taps the region 104, the operation detection unit 40 detects the imaging instructing operation and the imaging unit 20 starts imaging.

Since the imaging unit 20 executes the imaging immediately after the operation detection unit 40 detects the user's imaging instructing operation, a shutter chance intended by the user is not missed. In addition, the imaging of the imaging unit 20 is performed by utilizing a known technique.

After the user performs the imaging instructing operation, the user moves the finger or the like, by which the imaging instruction was performed, to the second region 102 or the third region 103 while the finger's contacting (or approaching) state is maintained. FIG. 4B shows an image displayed on the display unit 10 in this process.

In the first region 101 of FIG. 4B, the flower as the imaging target is not displayed and the first region 101 is darkened on the display unit 10. This is a result of control by the display control unit 30. When the imaging operation of the imaging unit 20 is completed and the operation detection unit 40 detects that the user has moved a finger or the like from the first region 101 to the second region 102 or the third region 103 while the contacting state of the finger or the like is maintained, the display control unit 30 reduces the luminance of a predetermined region (here, the first region 101) on the display unit 10.

The display control unit 30 reduces the luminance because the checking of the created image is completed and thus it is unnecessary to display the relevant image. The display control unit 30 may reduce the luminance of a predetermined region on the display unit 10 when a predetermined time required for checking the obtained image has elapsed.

In addition, when the imaging unit 20 creates the flower image, the imaging unit 20 temporarily stores the image in a memory.

The display control unit 30 moves a pointer along a detected locus along which the user has moved a finger or the like. The display control unit 30 also displays a small thumbnail image 108 corresponding to the obtained image so that the pointer is accompanied with the thumbnail image.

An arrow indicated by reference numeral 106 indicates an example of the locus along which the user moves a finger or the like so as to associate the obtained image to the user's current location. The user moves a finger or the like from the region 104 along the arrow 106 while maintaining the contacting or approaching condition and releases the finger or the like from the display unit 10 at any region 107 within the current location 105. Then the operation detection unit 40 detects the operation of releasing the finger or the like, and the image recording unit 50 associates the image, which was obtained and has been temporarily stored, with location information of the region 107 (in the shown example, information of the user's current location) and records the associated image and information in the storage unit 60.

In the present embodiment, the user's operation (after the imaging instruction) of (i) moving a finger or the like from the first region 101 to another region while the finger or the like still contacts or approaches the display unit 10 and (ii) releasing the finger or the like from the display unit 10 is called an "appending operation". That is, the appending operation is utilized to instruct the recording of the obtained image.

In contrast, the user may move a finger or the like along a locus indicated by an arrow 109 and release the finger or the like from the display unit 10 in any region 110 within the third region 103. In this case, the image recording unit 50 records the image, which was obtained and has been temporarily stored, in the storage unit 60 without associating the image with location information. Also in this case, the display control unit 30 displays a thumbnail image 108 along the locus (along which the user moves the finger or the like).

When the user performs the imaging instructing operation and then releases (isolates) the finger from the display unit 10 in the first region 101, the temporarily stored image is discarded without being recorded.

As described above, in the present embodiment, when the imaging unit 20 is activated by a user's operation, the display control unit 30 displays the first to third regions on the display unit 10. When the operation detection unit 40 detects the user's imaging instructing operation onto the first region 101, the imaging unit 20 starts the imaging operation.

According to the user's operation (which follows the imaging instructing operation) of appending the image to the relevant map information, when the completion of the appending operation is detected, the image recording unit 50 adds the location information of the position, at which the appending operation to the map information was performed, to the obtained image and records the image.

When the appending operation is performed toward the third region 103 after the imaging instructing operation, the image recording unit 50 records the image without associating it with the location information.

Although the above-described operation relates to the imaging of a static image as an example, the imaging of a video may be performed as follows.

First, when the user taps the first region 101 by using n fingers (e.g., two fingers) which is a manner different from that performed to instruct the imaging of a static image, the imaging unit 20 starts video imaging. During the video imaging, when the user taps the first region by using any number of fingers (e.g., one finger), the imaging unit 20 terminates the video imaging. The following operation is performed in the same manner as that performed for the static image.

The tapping operation can be performed, not only by a finger, but also by a stylus pen.

Figure 5:
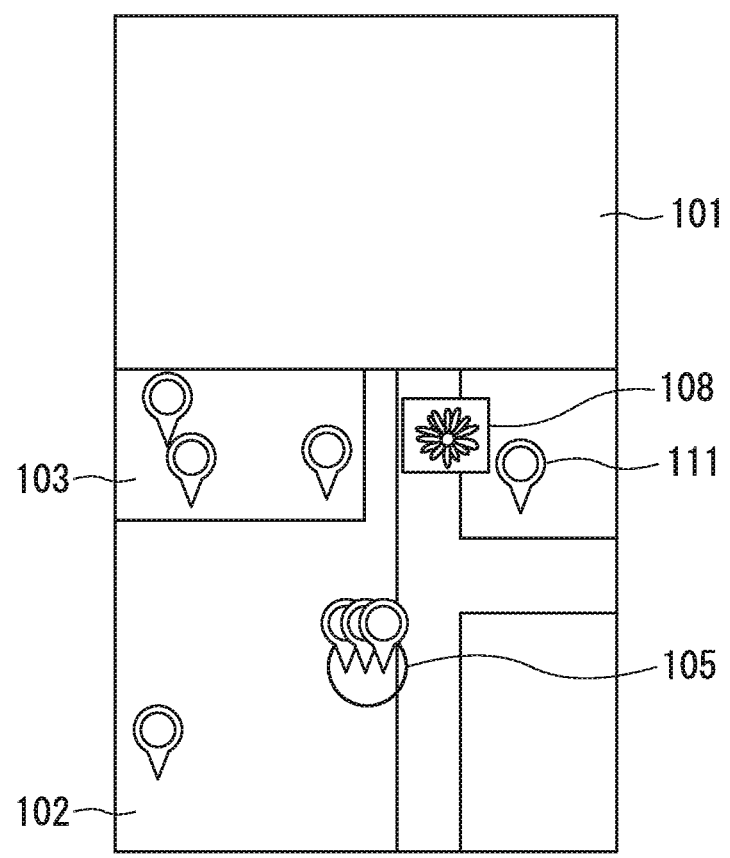
FIG. 5 is a diagram showing an example of the screen image in the imaging apparatus according to the first embodiment.

FIG. 5 is a diagram showing an example of the screen image in the imaging apparatus according to the present embodiment. FIG. 5 is utilized to explain how the image obtained by the user and the location information are displayed.

FIG. 5 shows an image displayed on the display unit 10 when the imaging unit 20 is activated by the specific operation. An image of an imaging target is displayed in the first region 101. Map information is displayed in the second region 102 while no map information is displayed in the third region 103.

In comparison with FIG. 4A, a plurality of pin marks 111 are displayed in the second region 102 and the third region 103 in FIG. 5 (in which, reference numeral 111 is applied to only one pin mark in consideration of the ease of viewing the figure). The pin marks 111 are appendage identification information displayed at each position where the user has performed the appending operation.

Each pin mark 111 in the second region 102 indicates that there is an image which has been stored in association with location information of a position where the pin mart 111 is displayed. The pin mark 111 may be displayed in red. However, the pin mark 111 displayed at the current location 105 (which indicates the actual location) may be displayed in green so as to distinguish this pin mark from the others.

In contrast, each pin mark 111 in the third region 103 indicates that there is an image which has no location information. The pin mark 111 in the third region 103 may be displayed in yellow so as to distinguish this pin mark from those in the second region 102.

When the user taps the position at which a pin mark 111 is displayed, the display control unit 30 displays an image associated with the periphery of the location of the pin mark 111, as a thumbnail image 108.

That is, if there is a stored image obtained by the user, then when the user activates the imaging unit 20, the display control unit 30 displays appendage identification information (i.e., pin marks 111) at individual positions on map information which correspond to previously obtained images, in a manner depending on a region where the operation of appending the relevant image was performed.

In another possible example, no pin marks are displayed in the third region 103. This example may employ an action such that when an icon image is tapped twice consecutively, a pop-up list of images which was stored together with no location information is displayed.

Figures 6A, 6B, 6C:
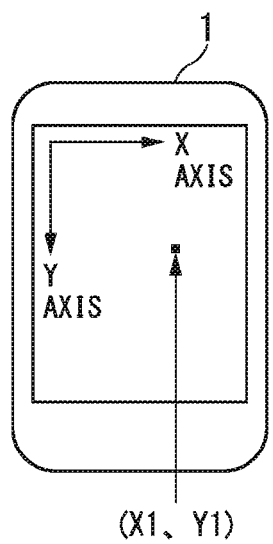
FIG. 6A is a diagram showing an example of tables stored in the imaging apparatus according to the first embodiment.
FIG. 6B is also a diagram showing an example of the tables stored in the imaging apparatus.
FIG. 6C is a diagram utilized to explain coordinate information for the display unit of the imaging apparatus.

FIGS. 6A and 6B are diagrams showing examples of tables stored in the imaging apparatus 1 according to the first embodiment.

FIG. 6A shows a table in which coordinate information about the display unit 10 is associated with location information on the map information. The values in columns "X axis" and "Y axis" in the table of FIG. 6A are respectively coordinate information items of the X axis and Y axis on the display unit 10 (see FIG. 6C). In addition, the column "location information" stores values, each of which indicates location information (longitude and latitude information) of a point on the map information, which are defined by the corresponding coordinates.

When the display control unit 30 displays map information, the display control unit 30 generates such a table and stores it in the storage unit 60. When the operation detection unit 40 detects the user's appending operation, the operation detection unit 40 outputs two-dimensional coordinate information of the appending position (where the appending was executed) in the X and Y directions to the image recording unit 50. Based on the two-dimensional coordinate information and the above table, the image recording unit 50 obtains location information (on the location information) where the appending operation was executed.

For example, the first line in FIG. 6A indicates that a map item at coordinates X1 and Y1 on the display unit 10 is positioned at 138° 47'49" east longitude and 35° 21'45" north latitude. After the user's imaging instructing operation, when the user moves the relevant finger or the like toward a position designated by the coordinates X1 and Y1 in the second region 102 and releases the finger or the like at this position from the display unit 10, the operation detection unit 40 outputs the coordinate information of X1 and Y1 to the image recording unit 50. Then the image recording unit 50 retrieves from the table of FIG. 6A, data of "138° 47'49" east longitude and "35° 21'45" north latitude as the location information to be associated with the obtained image.

The image recording unit 50 associates an identifier to identify the obtained image with the retrieved location information and stores the associated information in the table shown in FIG. 6B.

FIG. 6B shows a table in which each obtained image and location information associated therewith are stored. The value in an "identifier" column indicates the identifier to identify each obtained image. In addition, the value in a "location information" column indicates a position which is associated with the image having the identifier indicated in the "identifier" column, by utilizing latitude and longitude information.

When the user performs the appending operation as described above, the image recording unit 50 records in the above table, the identifier and location information of the obtained image, and also region segmentation information which indicates whether the appending operation was executed in the second or third region. If the user executed the appending operation in the third region 103, the image recording unit 50 records (i) relevant coordinate information as the location information and (ii) "3" as the region segmentation information (see line 3 in the table of FIG. 6B).

When the display control unit 30 displays the second region 102 and the third region 103, the display control unit 30 retrieves the location information and the region segmentation information from the above table. If the location information is included in an area (displayed on the map information) of the second region 102, a pin mark 111 is displayed in a manner depending of the relevant location (e.g., in green for the current location or in red for the other cases).

If the region segmentation information retrieved by the display control unit 30 is "3", the display control unit 30 displays a yellow pin mark 111 at the coordinate position stored as the location information of the relevant record.

Figure 7:
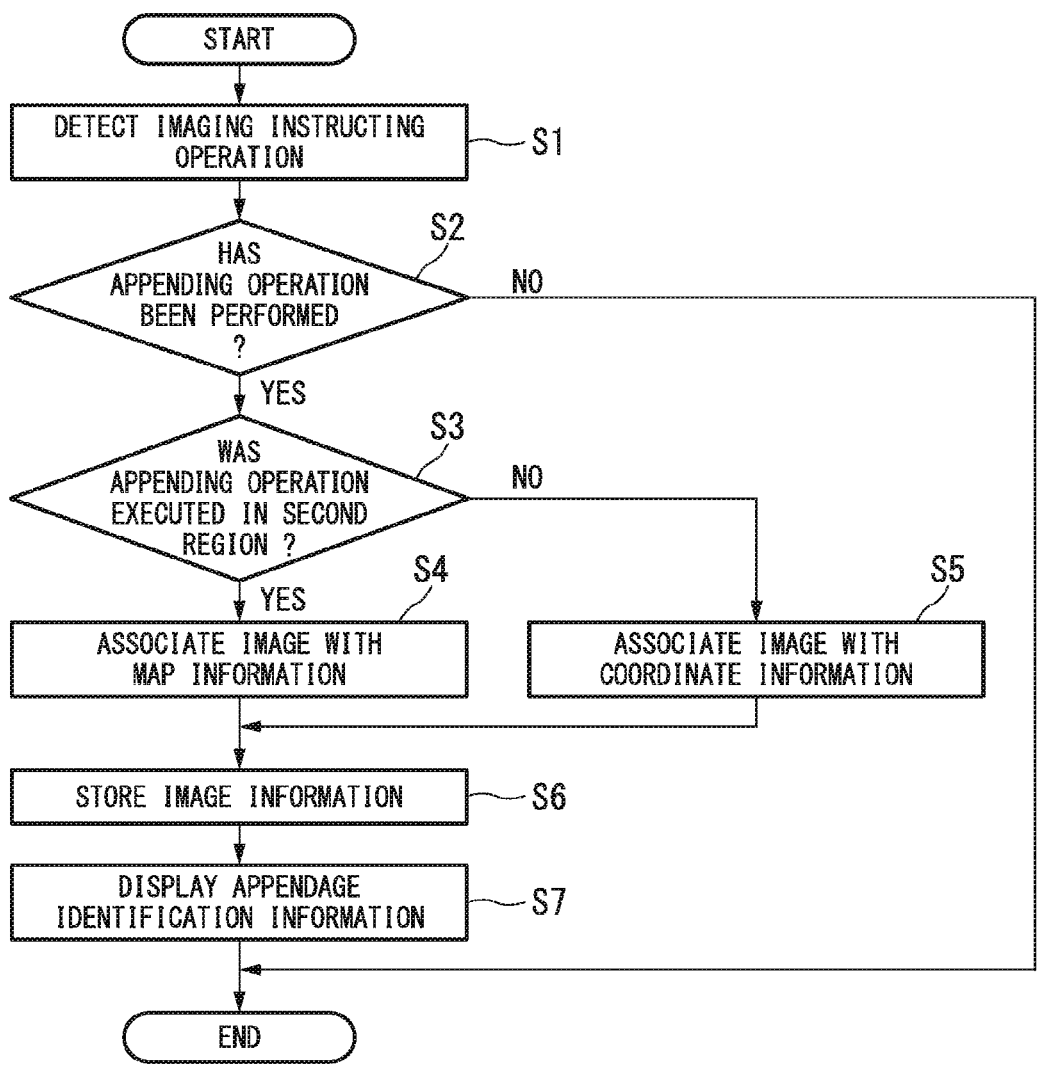
FIG. 7 is a diagram showing a flowchart of the imaging apparatus according to the present embodiment.

FIG. 7 is a diagram showing a flowchart of the imaging apparatus 1 according to the present embodiment.

FIG. 7 is utilized to explain the operation, which was explained with reference to FIGS. 4A and 4B, in detail.

As a premise, the user has activated the imaging unit 20 of the imaging apparatus 1 by a specific operation, and the first region 101, the second region 102, and the third region 103 are displayed on the display unit 10. In addition, the user is going to obtain, not a video, but a static image.

First, the operation detection unit 40 detects the user's imaging instructing operation (see step S1) and outputs corresponding instructing information to the imaging unit 20. When the imaging unit 20 receives the imaging instructing information, the imaging unit 20 executes the imaging and temporarily stores the created image in the memory.

The operation detection unit 40 continuously detects the contacting or approaching operation by the user's finger or the like onto the display unit 10. When the operation detection unit 40 detects the release of the user's finger or the like from the display unit 10, the operation detection unit 40 outputs the two-dimensional coordinate information (appendage coordinate information), which indicates the position where the release occurred" to the image recording unit 50.

Based on the appendage coordinate information, the image recording unit 50 determines whether or not the user has performed the appending operation (see step S2). That is, the image recording unit 5 determines whether or not the position indicated by the appendage coordinate information is included in the first region 101, by comparing the appendage coordinate information with the coordinate information which indicates the area of the first region 101, which is stored in the storage unit 60 in advance. If the position of the appendage coordinate information is included in the first region 101, the image recording unit 50 determines that the user performed no appending operation (i.e., "NO" in step S2) and discards the created image which has been temporarily stored in the memory. In this case, the present operation flow is terminated.

If the appendage coordinate information indicates a region other than the first region 101, the image recording unit 50 determines that the user performed the appending operation (i.e., "YES" in step S2) and further determines whether or not the appendage coordinate information is included in the second region 102, based on the coordinate information which indicates the area of the second region 102 (see step S3).

If the appendage coordinate information is included in the second region 102 (i.e., "YES" in step S3), the image recording unit 50 refers to the table (see FIG. 6A) (produced by the display control unit 30), in which the coordinate information on the display unit 10 is associated with the location information on the map information, so as to obtain the location information (i.e., latitude and longitude information) on the map information, where the user executed the appending operation, by utilizing the appendage coordinate information. The image recording unit 50 associates the location information with the identifier of the obtained image and stores the associated information in the table (see FIG. 6B) stored in the storage unit 60, where the table stores the obtained image and the location information associated with the image (see step S4).

If the appendage coordinate information is included in the third region 103 (i.e., "NO" in step S3), the image recording unit 50 associates the identifier of the obtained image with the appendage coordinate information and stores the associated information in the table (see FIG. 6B) which similarly stores the obtained image and the location information associated with the image (see step S5).

After step S4 or S5 is completed, the image recording unit 50 stores image information (binary data) of the obtained image in the storage unit 60 in association with the identifier of this image (see step S6).

The image recording unit 50 then outputs the appendage coordinate information to the display control unit 30. The display control unit 30 displays the appendage identification information (i.e., pin mark 111) at the relevant coordinate position in a manner depending on the appendage coordinate information (see step S7).

Then the present operation flow is terminated.

According to the present embodiment, the user can add any location information to the obtained image by a simple and intuitive operation performed immediately after the imaging. The user can also store the obtained image without adding location information. Additionally, since the user associates the image with a desired position on the map information immediately after the imaging, the imaging can be performed without missing a shutter chance.

Before the user performs the imaging instructing operation, the user may display the map information about any location by a scrolling operation for the second region 102. In this case, it is possible to associate the obtained image with desired location information other than that of the current location.

As a variation of the present embodiment, after the user's imaging instructing operation, map information that includes the current location maybe forcibly displayed even when map information that does not include the current location is being displayed. This variation is provided in consideration that the user associates the obtained image with the location information where the image was obtained, in most cases.

Such difference operations may be switched to each other by means of specific settings so that the user can select the operation in accordance with the taste of the user.

In addition, in the example explained with reference to FIG. 4B, the display control unit 30 reduces the luminance of the first region 101 after the imaging instructing operation of the user. However, after the user's imaging instructing operation, it is possible for the display control unit 30 to display the first region 101 whose area is reduced and instead to display the second region 102 which is enlarged. For example, when the operation detection unit 40 detects a movement of a finger or the like of the user after the user's imaging instructing operation, the display control unit 30 may reduce the area of the displayed first region 101 to approximately a size nearly the same as that of the third region 103 while enlarging the displayed map information. In another example, the display control unit 30 gradually reduces the area of the first region 101 in accordance with the movement of the user's finger or the like and finally displays no first region 101 while the map information is displayed on the entire area of the display unit 10 except for the third region 103.

Additionally, in the present embodiment, the user's appending operation that follows the user's imaging instructing operation is to (i) move a finger or the like to the second region 102 or the third region 103 while the finger or the like continuously contacts or approaches the display unit 10 and then (ii) release the finger or the like. However, the following operation can also be performed.

First, after the user's imaging instructing operation, the user's finger or the like is released from the first region 101 once. Then within a predetermined period of time (e.g., a few seconds), the user taps the second region 102 or the third region 103, by which the tapped position on the map information is associated with the obtained image. In this operation, if the first region 101 is tapped after imaging instructing operation, then the relevant image may be discarded.

Furthermore, the operation of the present embodiment have been explained by employing a smartphone having a touch panel as an example. However, the imaging apparatus 1 may be a PC connected to a camera, where the user may perform the imaging instructing operation or the appending operation by operating a mouse or touching a pad to access the first region 101, the second region 102, and the third region 103 which are displayed on a display of the PC.

Second Embodiment

Below, an imaging apparatus according to a second embodiment of the present invention will be explained with reference to FIG. 8.

In the second embodiment, the configuration of the imaging apparatus 1 is identical to that in the first embodiment. However, in comparison with the first embodiment, the second embodiment has a distinctive feature that the display control unit 30 displays plural types of map information items in the second region 102.

Figure 8:
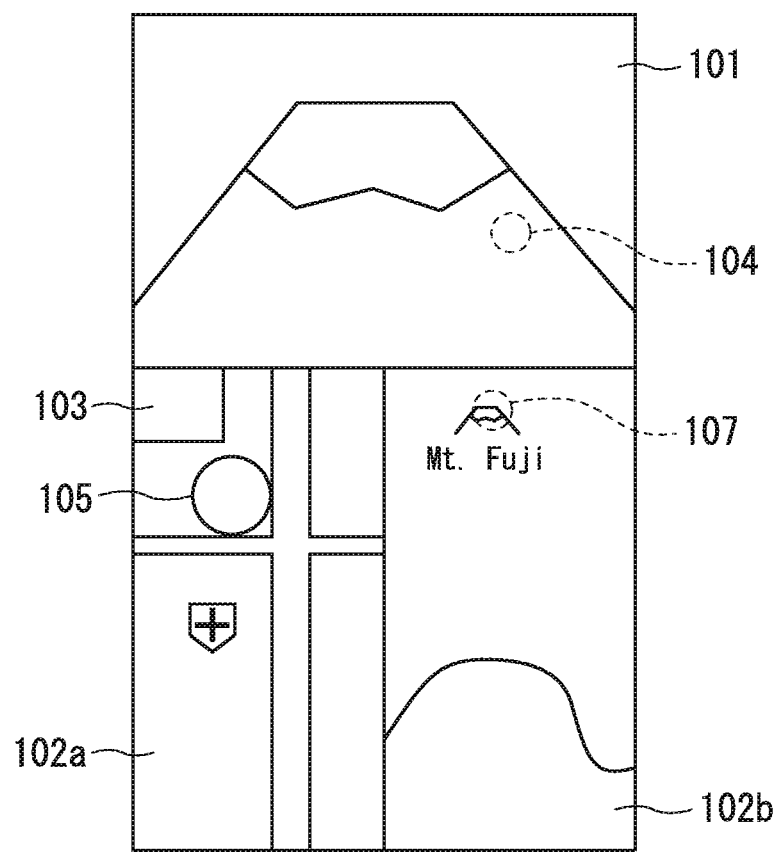
FIG. 8 is a diagram showing an example of a second region displayed in an imaging apparatus according to a second embodiment of the present invention.

FIG. 8 is a diagram showing an example of the second region 102 displayed in the imaging apparatus of the present embodiment.

The first region 101 and the third region 103 are similar to those in the first embodiment. In the first region 101, an image of Mt. Fuji is displayed as an example. In a second region 102a, map information of the current location may be displayed. In a second region 102b, a wide area map around Mt. Fuji may be displayed by means of a user's scrolling operation.

The user performs the imaging instructing operation onto the first region 101. After that, when the user performs the appending operation onto the current location 105 in the second region 102a, the image recording unit 50 associates the obtained image of Mt. Fuji with location information of the current location and stores the associated image and information in the storage unit 60. In addition, when the user performs the appending operation onto a region 107 in the second region 102b, the image recording unit 50 associates the obtained image of Mt. Fuji with location information of the region 107 in the vicinity of Mt. Fuji and stores the associated image and information in the storage unit 60.

According to the present embodiment, when the user desires to associate an image of one imaging target with a plurality of location information items and to store the image and information items, no complex operation is necessary such as to (i) move the map information so that not the current location but another desired location is displayed, (ii) perform the imaging instruction and the appending operation, (iii) restore the map which includes the current location, and (iv) perform the imaging instruction and the appending operation again.

In another example, if the user taps the current location 105 and the region 107 within a predetermined period of time after the user's imaging instructing operation by tapping the region 104, then the image recording unit 50 adds two individual location information items about the current location 105 and the region 107 to the obtained image and stores the image and information items.

The above-described imaging apparatus 1 includes a computer. The steps of each operation of the imaging apparatus 1 are stored as a program in a computer-readable storage medium, and the operation is performed when the relevant computer loads and executes the program.

The above computer readable storage medium is a magnetic disk, magneto optical disk, CD-ROM, DVD-ROM, semiconductor memory, or the like. In addition, the relevant computer program may be provided to a computer via a communication line, and the computer which received the program may execute the program.

In addition, the program may execute a part of the above-described functions.

Furthermore, the program may be a program (so-called "differential program") by which the above-described functions can be executed by a combination of this program and an existing program which has already been stored in the relevant computer system.

In addition, the structural elements in the above embodiments may be appropriately replaced with known structural elements without departing from the scope of the present invention. Furthermore, the technical range of the present invention is not limited to the above-described embodiments, and various modifications can be made without departing from the scope of the present invention.

Priority is claimed on Japanese Patent Application No. 2013-197753, filed Sep. 25, 2013, all disclosed contents of which are incorporated herein by reference.

INDUSTRIAL APPLICABILITY

In accordance with the present invention, it is possible to obtain an effect to easily associate an obtained image with location information.

REFERENCE SYMBOLS 1 imaging apparatus
10 display unit
20 imaging unit
21 lens
30 display control unit
40 operation detection unit
50 image recording unit
60 storage unit
101 first region
102 second region
103 third region
104 region
105 current location
107 region
108 thumbnail image
110 region
111 pin mark

The invention claimed is:

1. An imaging apparatus comprising:
a display control unit that displays, according to an operation of activating an imaging unit, a first region in which an image created by the imaging unit is displayed, a second region in which map information is displayed, and a third region in which no map information is displayed; and
an image recording unit, wherein according to an operation of appending the image to the second region after an imaging instructing operation for the first region, the image recording unit adds location information about a position, at which the appending operation to the second region has been performed, to the image, and stores the image,
wherein the image recording unit stores the image with which no location information is associated when an operation of appending the image to the third region is performed after the imaging instructing operation.

2. The imaging apparatus in accordance with claim 1, wherein:
creation of the image is started when the imaging instructing operation is detected; and
the image is recorded when completion of the appending operation to the second region or the third region is detected.

3. The imaging apparatus in accordance with claim 1, wherein:
the display control unit displays appendage identification information at a position at which the appending operation to the second region or the third region has been performed, in a manner depending on the region which includes this position.

4. The imaging apparatus in accordance with claim 1, wherein:
after the imaging instructing operation, the display control unit displays map information, whose map includes a current location, in the second region until the appending operation to the second region or the third region is completed.

5. The imaging apparatus in accordance with claim 1, wherein:
after the imaging instructing operation, the display control unit reduces luminance of the first region.

6. The imaging apparatus in accordance with claim 1, wherein:
after the imaging instructing operation, the display control unit reduces area of the first region.

7. The imaging apparatus in accordance with claim 1, wherein:
in the appending operation to the second region or the third region, the display control unit displays a thumbnail image in a vicinity of a displayed pointer.

8. An imaging method comprising:
displaying, according to an operation of activating an imaging unit, a first region in which an image created by the imaging unit is displayed, a second region in which map information is displayed, and a third region in which no map information is displayed; and
performing recording, wherein according to an operation of appending the image to the second region after an imaging instructing operation for the first region, location information about a position, at which the appending operation to the second region has been performed, is added to the image, and the image is stored,
wherein the performing recording includes storing the image with which no location information is associated when an operation of appending the image to the third region is performed after the imaging instructing operation.

9. A non-transitory computer-readable storage medium that stores a program which, when executed, causes a computer to perform a method comprising:
displaying, according to an operation of activating an imaging unit, a first region in which an image created by the imaging unit is displayed, a second region in which map information is displayed, and a third region in which no map information is displayed; and
performing recording, wherein according to an operation of appending the image to the second region after an imaging instructing operation for the first region, location information about a position, at which the appending operation to the second region has been performed, is added to the image, and the image is stored;
wherein the performing recording includes storing the image with which no location information is associated when an operation of appending the image to the third region is performed after the imaging instructing operation.

10. An imaging apparatus comprising:
a display control unit that displays, according to an operation of activating an imaging unit, a first region in which an image created by the imaging unit is displayed and a second region in which map information is displayed; and
an image recording unit, wherein according to an operation of appending the image to the second region after an imaging instructing operation for the first region, the image recording unit adds location information about a position, at which the appending operation to the second region has been performed, to the image, and stores the image,
wherein after the imaging instructing operation, the display control unit reduces luminance of the first region.

11. An imaging apparatus comprising:
a display control unit that displays, according to an operation of activating an imaging unit, a first region in which an image created by the imaging unit is displayed and a second region in which map information is displayed; and
an image recording unit, wherein according to an operation of appending the image to the second region after an imaging instructing operation for the first region, the image recording unit adds location information about a position, at which the appending operation to the second region has been performed, to the image, and stores the image,
wherein after the imaging instructing operation, the display control unit reduces area of the first region.

12. An imaging method comprising:
displaying, according to an operation of activating an imaging unit, a first region in which an image created by the imaging unit is displayed and a second region in which map information is displayed; and
performing recording, wherein according to an operation of appending the image to the second region after an imaging instructing operation for the first region, location information about a position, at which the appending operation to the second region has been performed, is added to the image, and the image is stored,
wherein the displaying the first region and the second region includes reducing luminance of the first region after the imaging instructing operation.

13. An imaging method comprising:
displaying, according to an operation of activating an imaging unit, a first region in which an image created by the imaging unit is displayed and a second region in which map information is displayed; and
performing recording, wherein according to an operation of appending the image to the second region after an imaging instructing operation for the first region, location information about a position, at which the appending operation to the second region has been performed, is added to the image, and the image is stored,
wherein the displaying the first region and the second region includes reducing area of the first region after the imaging instructing operation.

14. A non-transitory computer-readable storage medium that stores a program which, when executed, causes a computer to perform a method comprising:
displaying, according to an operation of activating an imaging unit, a first region in which an image created by the imaging unit is displayed and a second region in which map information is displayed; and
performing recording, wherein according to an operation of appending the image to the second region after an imaging instructing operation for the first region, location information about a position, at which the appending operation to the second region has been performed, is added to the image, and the image is stored, wherein the displaying the first region and the second region includes reducing luminance of the first region after the imaging instructing operation.

15. A non-transitory computer-readable storage medium that stores a program which, when executed, causes a computer to perform a method comprising:

displaying, according to an operation of activating an imaging unit, a first region in which an image created by the imaging unit is displayed and a second region in which map information is displayed; and performing recording, wherein according to an operation of appending the image to the second region after an imaging instructing operation for the first region, location information about a position, at which the appending operation to the second region has been performed, is added to the image, and the image is stored, wherein the displaying the first region and the second region includes reducing area of the first region after the imaging instructing operation.

16. An imaging apparatus comprising:

a memory storing instructions; and a processor configured to execute the instructions to:

display, according to an operation of activating an imaging unit, a first region in which an image created by the imaging unit is displayed, a second region in which map information is displayed, and a third region in which no map information is displayed; and perform recording, wherein according to an operation of appending the image to the second region after an imaging instructing operation for the first region, location information about a position, at which the appending operation to the second region has been performed, is added to the image, and the image is stored, wherein the performing recording includes storing the image with which no location information is associated when an operation of appending the image to the third region is performed after the imaging instructing operation.

17. An imaging apparatus comprising:

a memory storing instructions; and a processor configured to execute the instructions to:

display, according to an operation of activating an imaging unit, a first region in which an image created by the imaging unit is displayed and a second region in which map information is displayed; and perform recording, wherein according to an operation of appending the image to the second region after an imaging instructing operation for the first region, location information about a position, at which the appending operation to the second region has been performed, is added to the image, and the image is stored, wherein the displaying the first region and the second region includes reducing luminance of the first region after the imaging instructing operation.

18. An imaging apparatus comprising:

a memory storing instructions; and a processor configured to execute the instructions to:

display, according to an operation of activating an imaging unit, a first region in which an image created by the imaging unit is displayed and a second region in which map information is displayed; and perform recording, wherein according to an operation of appending the image to the second region after an imaging instructing operation for the first region, location information about a position, at which the appending operation to the second region has been performed, is added to the image, and the image is stored, wherein the displaying the first region and the second region includes reducing area of the first region after the imaging instructing operation.

* * * * *